United States Patent [19]

Kautt

[11] Patent Number: 4,930,212

[45] Date of Patent: Jun. 5, 1990

[54] MACHINE FOR ASSEMBLING THE DIFFERENT PARTS OF A FITTING ELEMENT OF A DOOR OR WINDOW FITTING

[75] Inventor: Jean-Jacques Kautt, Strasbourg, France

[73] Assignee: Ferco International, Sarrebourg, France

[21] Appl. No.: 243,713

[22] Filed: Sep. 13, 1988

[30] Foreign Application Priority Data

Sep. 21, 1987 [FR] France .................................. 87 13171

[51] Int. Cl.$^5$ ............................................. B23P 21/00
[52] U.S. Cl. ....................................... 29/788; 29/783; 29/796
[58] Field of Search ................... 29/788, 789, 790, 783, 29/791, 795, 796, 818, 822, 823, 771; 198/456, 457, 602, 403

[56] References Cited

U.S. PATENT DOCUMENTS

| | | | |
|---|---|---|---|
| 2,602,562 | 7/1952 | Brescian | 29/788 X |
| 3,077,660 | 2/1963 | Essenberg | 29/788 X |
| 3,537,168 | 11/1970 | Carroll | 29/788 X |
| 3,659,330 | 5/1972 | DeVillier et al. | 29/788 X |
| 3,766,626 | 10/1973 | Mjos et al. | 29/788 X |

Primary Examiner—Mark Rosenbaum
Assistant Examiner—Peter D. B. Vo
Attorney, Agent, or Firm—Sandler & Greenblum

[57] ABSTRACT

A machine intended for assembling the different parts of a fitting element (2) of a door or window fitting composed of an operating rod (3) and of a plate (4) having, for each part to be assembled (6, 7, 11, 18, 19, 23, 28, 29, 34) a supply magazine (53, 54, 56, 58, 63, 78, 79, 92, 101) and means of gripping (55, 59, 60, 65, 86, 95).

This machine has, in addition, means (44, 50A) of separate flow of the plate (4) and of the operating rod (3) and means (50B, 74, 76, 100) of superimposed flow of the latter, means of transfer (49, 68, 98, 107) for turning round and transferring from one transporter to another the plate (4) and/or the operating rod (3), while maintaining the reference plane (46) of the fitting element (2) at a constant distance from the median plane (47) of the machine (1).

7 Claims, 2 Drawing Sheets

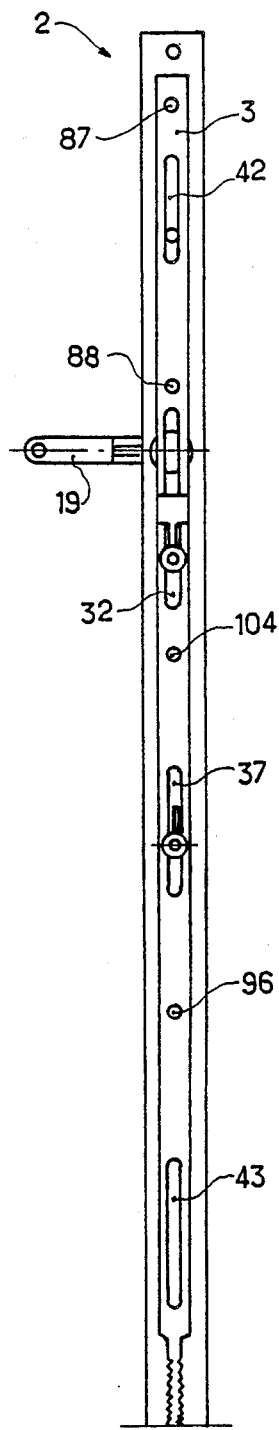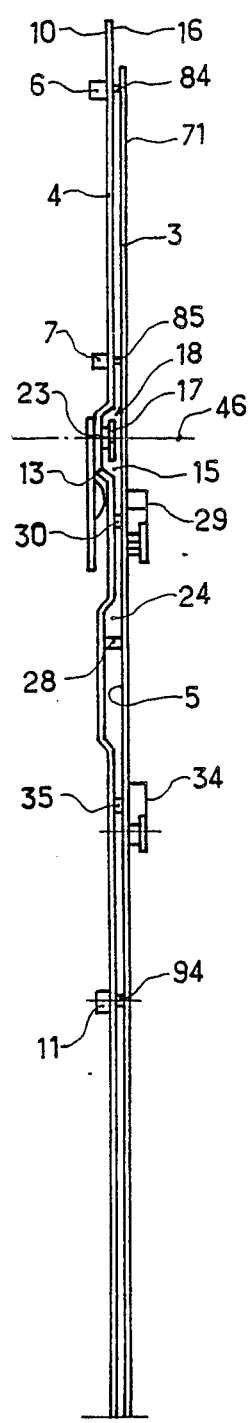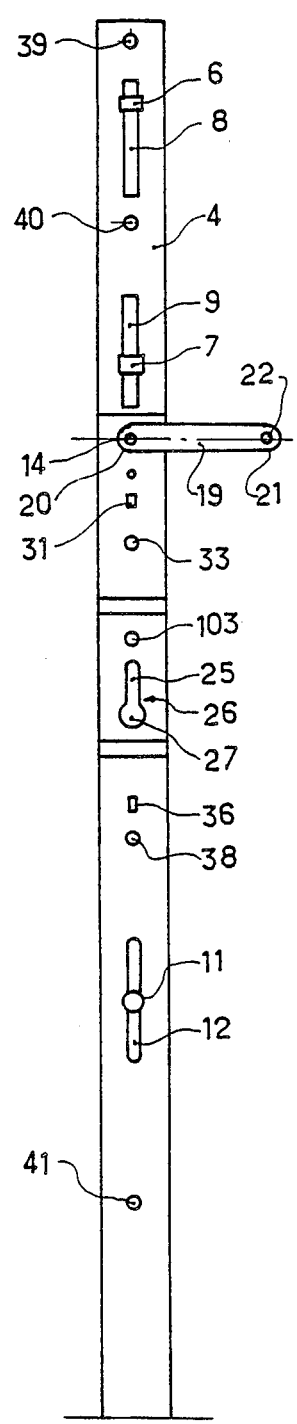

MACHINE FOR ASSEMBLING THE DIFFERENT PARTS OF A FITTING ELEMENT OF A DOOR OR WINDOW FITTING

BACKGROUND OF THE INVENTION

The present invention is directed to a machine for assembling different parts of an element of a door or window fitting, such as a group formed by an operating rod and an edge-plate cooperating via an auxiliary arm with a compass arm in one piece with a window casing frame of a tipping frame window. The machine comprises for each part to be assembled, a magazine for feeding, a manipulator, means of gripping, and a succession of transporters advancing step by step and presenting the longitudinal plane of this group perpendicularly to the direction of advance.

An installation is already known for assembling the different parts of a fitting element, such as an espagnolette of a fitting for a window, door or similar, placed at regular intervals on a transporter, advancing step by step of the installation and comprising, for each part to be assembled, at least one assembly station disposed according to a reference plane of the fitting element. This transporter comprises means for advancing formed by a conveyor presenting the longitudinal plane of the fitting groups to be assembled perpendicularly to the line of advance of said conveyor. The breadth of the latter is at least equal to the sum of the greatest possible breadth of the fitting element and the lengths of travel in lateral displacement of the element. The length of the conveyor is equal to the breadth of an assembly station or a group of assembly stations. The advancing means are combined with lateral displacement means that are situated between two assembly stations and two groups of assembly stations. Their purpose is to confer on the fitting element of a bidirectional movement of which each travel is determined according to the reference plane of the fitting element.

A device is also known for assembling different parts of a fitting element, such as a compass arm, comprising, for each part to be assembled, at least one assembly station and a transporter which advances step by step and is provided with at least one conveyor. The latter presents the longitudinal axis of the compass arm perpendicularly to the line of advance of the conveyor and to the means of displacement of the compass arm, so as to confer a bidirectional movement to the compass arm. This device for assembly also comprises means of positioning the compass arm in relation to the assembly and machining according to two reference planes of the compass arm. One of these reference planes comprises an edge of the threaded axis that is situated at one of the extremities of the compass arm, on which is threaded the pivot which causes the leaf of the window to rotate. The other reference plane is formed by the centre of the axis of articulation connecting the leaf to the frame of the window.

However, because of the fact that the fitting element is displaced perpendicularly in relation to the median plane of the installation or assembly device, it is necessary for the transporter to present a great breadth, since this breadth must be at least equal to the sum of the greatest possible length of the fitting element and the bilateral displacement travel length.

SUMMARY OF THE INVENTION

The aim of the present invention is to supply a machine that permits the assembly of a fitting element intended to cooperate with compass arm in one place with the window casing frame of the tipping window, housed in a groove made in the edge of the leaf of this tipping window.

This machine, according to the invention, permits the automated assembly of a fitting element that is composed, on the one hand, of an operating rod comprising at least one locking pin cooperates with a locking ramp of the compass arm and at least one locking roller that cooperates with a keeper in one piece with the window casing. On the other hand, this fitting element is equipped with an edge-plate comprising an auxiliary arm that links this fitting element to the compass arm of an anti-tampering case and a guide screw.

It is thus necessary to provide for a double assembly, on the one hand, of the accessory elements (locking pin, linking roller or auxiliary arm, anti-tampering case and guide screw) and, on the other hand, the assembly of the latter.

For this purpose, the invention concerns a machine for assembling the different parts of a fitting element, such as a group formed of an operating rod and an edge-plate, cooperating via an auxiliary arm with a compass arm in one piece with the casing of a tipping window, this machine comprising, for each part to be assembled, a magazine for feeding, a manipulator, means of gripping and a succession of transporters advancing step by step and presenting the longitudinal plane of this group perpendicularly to the direction of advance, characterized by the fact that it comprises, in combination:

means for separate travel for the edge-plate and for the operating rod placed alternatively by means of transfer on one of the transporters advancing step by step;

means for superimposed travel of the edge-plate and of the operating rod;

means for putting into a waiting position and/or an active position the edge-plate and the operating rod in separate or in superimposed positions, and the different parts to be assembled taken from the storage magazine by means of gripping and taken to the right of these means; and means for transferring upwards the outside face of the edge-plate, or the inside face of the operating rod assembled to the edge-plate, with a view to rivetting together the different parts to be assembled, maintaining the reference plane of the fitting element at a constant distance from the median plane of the machine.

The advantages presented by this invention consist essentially in the fact that the assembly of the edge-plate and of the operating rod is automated, each being fitted with its accessory elements, this being done by a machine of smaller breadth than the known machines.

BRIEF DESCRIPTION OF THE DRAWINGS

The invention will be clearly understood by reference to the following description, given as a non-limitative example, and to the attached diagram in which:

FIGS. 1 to 3 represent a fitting element made using an assembly machine shown in FIG. 4 according to the invention, wherein, FIG. 1 is a rear view of a fitting element that has had various parts assembled to it by an assembly machine;

FIG. 2 is a side view of the fitting element of FIG. 1;

FIG. 3 is a front view of the fitting element of FIG. 1; and

DETAILED DESCRIPTION OF THE DRAWINGS

Figure 4:
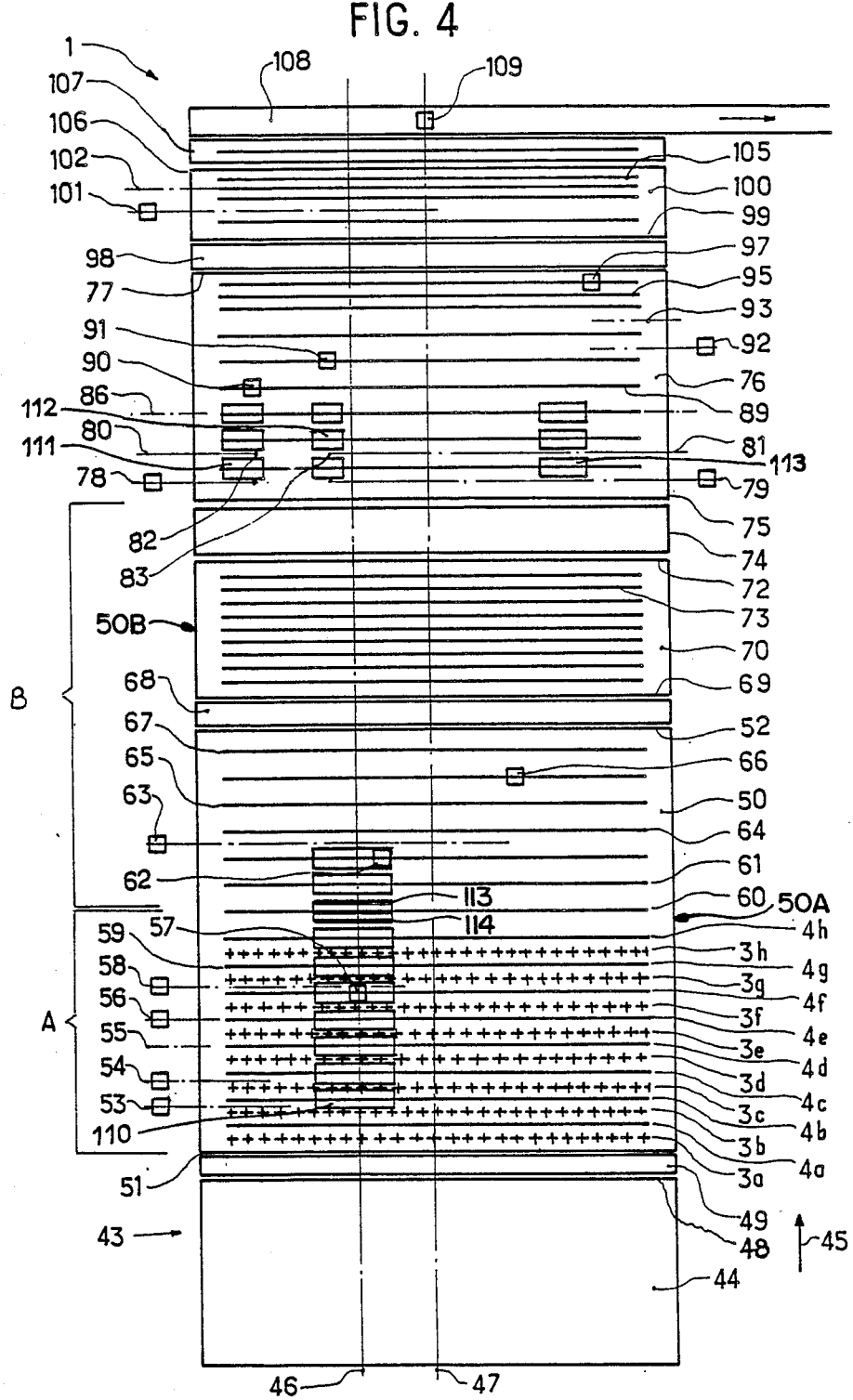
FIG. 4 schematically illustrates a preferred embodiment of the assembly machine that is used to assemble the various parts to the fitting element shown in FIGS. 1–3.

Reference is made to FIGS. 1 to 4.

An assembly machine 1 is intended for the manufacture of a fitting element 2. The fitting element 2 comprises an operating rod 3 that slides in a groove made in the edge of a leaf, of a window, and more particularly a tipping window, and an edge-plate 4 covers the groove and the operating rod 3.

This fitting element 2 has, on the one hand, to cause the closing and/or opening of the tipping window and, on the other hand, to cooperate with a compass arm in one piece with the casing of this tipping window.

To do this, outside face 5 of the operating rod 3 comprises at least one locking pin 6, 7 crossing an oblong opening 8, 9 made in the edge-plate 4 and projecting from the outside face 10 of the latter. The locking pins 6, 7 are intended to cooperate with one or more locking ramps on the compass arms in one piece with the window casing. In addition, the outside face 5 of the operating rod 3 presents at least one locking roller 11 that also crosses an oblong opening 12 of the edge-plate 4 to project in relation to the outer face 10 of the latter so that it cooperates with a keeper in one piece with the casing of the tipping window.

The edge-plate 4 comprises a first uncoupling 13 in relief from the outer face 10 of the edge-plate 4, in such a way as to produce a recess 15 between inner face 16 of the plate 4 and the outer face 5 of the operating rod 3. Recess 15 serves as housing for head 17 of an axis of articulation 18 which permits the rotation of an auxiliary arm 19 that serves as a link between the plate 4 of the leaf and the compass arm in one piece with the window casing. One extremity 20 of the auxiliary arm 19 is rivetted to the extremity 14 of the axis of articulation 18. Another extremity 21 of the auxiliary arm 19 comprises an orifice 22 for the subsequent passage of an axis of articulation that provides the connection between the auxiliary arm 19 and the compass arm in one piece with the window casing. To assure the rotation of the axis of articulation 18, the latter has a lock washer inserted between the head 17 and the inner face 16 of the edge-plate 4.

In addition, the plate 4 comprises a second uncoupling 24, also in relief from the outer face 10. In this second uncoupling 24, an oblong opening 25 is made, one of its extremities 26 presenting an enlargement 27 for the passage of the head of an axis of articulation which assures the connection between the plate 4 and the extremity of the compass arm. To prevent this second uncoupling 24 from being crushed, a spacer 28 is included which maintains the distance between the operating rod 3 and the edge-plate 4.

The inner face 16 of the plate 4 is equipped with an anti-tampering case 29 fitted with a stud 30 that is rivetted to an orifice 31 made in the plate 4. This anti-tampering case 29, traversing an oblong opening 32 made in the operating rod 3, has a boring for the passage of a fixing screw that traverses an orifice 33 made in the plate 4, assuring the fixing of the latter in the groove in the edge of the leaf.

In addition, the inner face 16 of the plate 4 comprises a guide screw 34 equipped with a stud 35 that is rivetted to an orifice 36 made in the plate 4. This guide screw 34 can slide in an oblong opening 37 made in the operating rod 3. This guide screw 34 is traversed by a fixing screw engaged in an orifice 38 made in the plate 4 to assure the fixing of the latter.

The plate 4 has a number of orifices 39, 40, 41 for fixing screws; it being understood that the operating rod 3 presents to the right of these orifices 39, 40, 41 oblong openings 42, 43 for the passage of these fixing screws.

According to the invention, the different parts enumerated above are assembled by the machine for making the fixing element 2.

The assembly machine 1 has at its entry 43 a means for moving the operating rod 3 and plate 4. These means include a storage magazine 44 for the operating rods 3 and plates 4, permitting this machine 1 to be continuously supplied with operating rods 3 and plates 4. The operating rod 3 comprises all the different oblong openings 32, 37, 42, 43 and the plate 4 presents the uncouplings 13, 24, the oblong openings 8, 9, 25, 12 and the different orifices 31, 33, 36, 38, 39, 40, 41. The magazine 44 comprises two superimposed transporters having a step by step travel, one of them being intended for moving the operating rods 3 and the other for moving the plates 4. It is preferable to place the operating rods 3 in parallel on the upper transporter in such a way that their juxtaposed longitudinal axes are perpendicular to the direction of advance 45 and that the outer face 5 is directed upwards. The plates 4, disposed in parallel on the lower transporter, present their juxtaposed longitudinal axes perpendicularly to the direction of advance 45, the inner face 16 being directed upwards. The lower transporter has a centering guide which engages the first uncoupling 13 to centre the reference plane 42 of the fixing element 2 in reference to the median plane 47 of the assembly machine 1. According to the invention, reference plane 46 is at a constant distance from the median plane 47 from the entry up to the exit of the machine.

Located at exit 48 of the magazine 44 are means for transfer 49, which permit the operating rods 3 and the plates 4 to be transferred to a first transporter 50. The means transfer 49 comprises an oscillating loading arm which takes the plate 4 from the upper transporter of the magazine 44 and places it, after turning it around, on a first transporter 50 in such a way that the outer face 10 is directed upwards.

In addition, the transfer means 49 comprises a transfer element that assures the placing of the operating rod 3 below the plate 4 at entry 51 of the first transporter 50. By turning around the operating rod 3, the transfer travel of the latter is reduced, and the space between the magazine 44 and the first transporter 50 is reduced. First section A of the first transporter 50 constitutes one of the means for the separate movement of the plate 4 and the operating rod 3.

The first transporter 50 preferably comprises a chain transporter having at least two parallel chains which are driven by toothed pinions. Fixed on the chains are means for putting into a waiting and/or an active position the different main parts, such as operating rods 3, plates 4, and accessories such as the auxiliary arm 19, the anti-tampering case 29, the guide screw 34, the locking pins 6, 7, the locking rollers 11 and rows of lugs with several functions. On the one hand, the chains must assure the advance of the fitting element from the entry 51 to the exit 52 of the first transporter 50; on the other hand, they present recesses that serve as magazines in which, one by one, the different parts to be assembled, and which are in a waiting position, will be housed.

Furthermore, they permit the operating rod or the plate to the put into the waiting position, and comprise parallel transversal housings.

Finally, they assure that the operating rods or the plates are put into the active position. The studs supporting the plates 4 alternate with the studs supporting the operating rods 3.

We take from a storage magazine 53 and put into place, using means for gripping, such as a manipulator, in one of the recesses of the lugs 110 supporting the plate 4, the axis of articulation 18 directed upwards, the head 17 being housed in this recess. After a step by step advance, these lugs 110 are presented in front of a storage magazine 54 which contains the lock washers 23. By appropriate means, such as a manipulator, the lock washer 23 is threaded onto the axis of articulation 18. After a step by step advance, the lug 110, fitted with the plate 4 and the axis of articulation 18 fitted with its lock washer 3 are taken to means for gripping 55, which places the plate 4 on the axis of articulation 18. The lugs 110 are then taken towards a storage magazine 56 which contains the auxiliary arms 19. Using a manipulator, one of these auxiliary arms 19 is threaded on the axis of articulation 18, projecting in relation to the upper face 10 of the operating rod 3.

Using a rivetter 57, the auxiliary arm 19 is rivetted onto the axis of articulation 18, placing the auxiliary arm 19 perpendicular to the plate 4.

After the rivetting, another manipulator takes an entirely assembled anti-tampering case 29 from a storage magazine 58 and places it in a waiting position in a second recess of the lugs 110 supporting the plate 4 fitted with the auxiliary arm 19 rivetted onto the axis of articulation 18.

Then, with the aid of means for gripping 59, the operating rod 3 is placed below the anti-tampering case 29, in such a way that the latter projects across the opening 32. Up to this stage, there was a separation between the plate 4 and the operating rod 3, the latter being placed below the former. In FIG. 4, the different positions of the operating rod, schematized by a line of crosses, are defined by the references 3a, 3b, 3c, 3d, 3e, 3f, 3g, 3h and the different positions of the plate are schematized by a continuous line by the references 4a, 4b, 4c, 4d, 4e, 4f, 4g, 4h.

The means for separate movement of the plate 4 and the operating rod 3 described above are followed by superimposed means for movement of the plate 4 and the operating rod 3, comprising a means for gripping 60, of section B of the first transporter 50.

After laying the operating rod 3 on the anti-tampering case 29, and after greasing the latter, using the means for gripping 60, the plate 4 is placed on the operating rod 3 in such a way that the lug 30 is lodged in orifice 31 of the plate 4. Then, at 61 a light mist of lubricating oil is spread over the plate 4, at the place of the anti-tampering case 29. After oiling, the stud 30 is rivetted using a rivetter 62. By this rivetting, we make the first assembly of the operating rod 3 and the edge-plate 4.

After rivetting, a manipulator takes a guide screw 34 from a storage magazine 63. The guide screw 34, however, can be put in two different positions. This is why the lugs have two reservations for placing the guide screw 34, the position of the latter being defined by the modification of the travel of a jack of the manipulator, which is produced automatically by the programming of the machine.

The assembly 64, consisting of the plate 4 placed on the operating rod 3, is placed by means for gripping 65 on the guide screw 34 in the waiting position, and housed in one of the lugs, in such a way that the stud 35 of the guide screw 34, traversing the oblong opening 37 in the operating rod 3, engages the orifice 36 made in the plate 4.

Then, using a rivetter 66, the guide screw 34 is rivetted. After rivetting, this assembly 34 is presented to a control post 67 for verifying the presence of the different parts, and in particular the presence of the lock washer 23. At the same place, the auxiliary arm 19 is folded back in the longitudinal axis of the assembly 64.

The latter leaves the first transporter 50 and is taken on by means for transfer 68, comprising an oscillating loading arm for placing the assembly, after turning it around again, at entry 69 of a second transporter 70. After it has been turned around again, inner face 71 of the operating rod 3 (see FIG. 2) is directed upwards. The second transporter 70 also comprises a chain transporter with at least two chains driven by motor pinons that advances assembly 64 in a step by step fashion to exit 72 of the transporter 70. The latter permits a buffer stock of assemblies 64 to be constituted, and comprises a control post 73 for verifying the presence of the anti-tampering case 29 and the guide screw 34.

Then, the assembly 64 is horizontally transferred by means for transfer 74 to entry 75 of a third transporter 76, the inner face 71 of the operating rod being kept directed upwards. The third transporter 76 comprises a chain transporter with at least two parallel chains driven by motor pinions and is provided with lugs that assures a step by step advance of the assemblies 64 from the entry 75 to exit 77 of the third transporter 76. During this displacement, the assemblies 64 are fitted with at least one locking pin 6 and at least one locking roller 11.

To do this, the third transporter 76 comprises one or more magazines 78, 79 for supplying locking pins 6, 7. If there are two supply magazines, 78, 79, they are placed on either side of the median plane 47 of the machine. Using manipulators 80, 81, the locking pins 6, 7 are put in waiting positions 82, 83 and placed in the housings in the lugs 111, 112. However, according to the model of the fitting element 2, one of the two locking pins 7 can be situated at several different distances from the other locking pin 6. For this purpose, manipulator 81 has a variable travel jack, the travel being automatically defined by the programming of the machine. The locking pins 6, 7 are placed in such a way that their axes 84, 85 (see FIG. 2) are facing upwards and so the row of lugs 111, 112, intended for the reception of this locking pin 7, have a reservation for each position of the locking pin 7. Then, by means for gripping 86, the assembly 64 is placed on the locking pins 6, 7 in such a way that their axes 84, 85 engage orifices 87, 88 (see FIG. 1) of the operating rod 3.

After control 89 detects the presence of the locking pins 6, 7, a rivetter 90 rivets the first locking pin 6 and a second rivetter 91 rivets the second locking pin 7, it being understood that the position of the second rivetter 91, in relation to the median plane 47 of the machine 1, depends on the position of the second locking pin 7.

When the fitting element 2 has a locking roller 11 (as shown in FIGS. 2 and 3), the third transporter 76 is fitted with a magazine 92 for supplying the locking roller 11. The locking roller 11 is placed in the waiting position in a housing made in the lug 113 by a manipulator 93 in such a way that its axis 94 (see FIG. 2) is directed upwards. The assembly 64 is then placed on the locking roller 11 by a means for gripping 95, in such a way that the axis 94 traverses the opening 12 made in the plate 4 and engages an orifice 96 (see FIG. 1) made in the operating rod 3. Then, using a rivetter 97, the locking roller 11 is rivetted.

At the exit 77 of the third transporter 76, the assembly 64 is taken by a means for transferring 98, which comprises an oscillating loading area for placing the assembly 64, after turning it around again, at entry 99 of a fourth transporter 100, which comprises a chain transporter having a magazine 101 for supplying spacers 28. A spacer 28 is forced into an orifice 103 (see FIG. 3) made in the plate 4 by a manipulator 102, and communicates with an orifice 104 (see FIG. 1) made in the operating rod 3. After passing through a final control post 105, the fitting element 2, entirely assembled, is taken at exit 106 of the fourth transporter 100 and placed, by means for transferring 107, fitted with an oscillating loading arm, on a removal transporter 108, after being turned around again so that the inner face 71 of the operating rod 3 is directed upwards.

If necessary, the removal transporter 108 has a rivetter 109 for rivetting the spacer 28.

I claim:

1. A machine for assembling various parts to a fitting element, comprising:
   (A) a plurality of supply magazines that contain parts that are to be attached to said fitting element;
   (B) a plurality of gripping means that operate to remove said parts that are stored in said storage magazines;
   (C) means for delivering said fitting element to an entry point of said assembly machine;
   (D) a plurality of transporters for advancing said fitting element step by step along an assembly path of said assembling machine to predetermined assembly points proximate each storage magazine;
   (E) means of selectively placing said transporters into a a waiting state so that a part can be assembled to said fitting element, one of said gripping means operating to remove said part to be attached to said fitting element from one of said storage magazines associated with one of said transporters;
   (F) a plurality of manipulators for attaching said parts to said fitting element;
   (G) a plurality of transferring means, each transferring means being interposed between two transporters for transferring said fitting element from one transporter to another transporter, said transferring means orienting said fitting element to a desired position so that said parts in said storage magazine can be attached to the proper place on said fitting element wherein the machine includes a means for flipping over the fitting element so that parts can be attached to the appropriate side of the fitting element;
   (H) means for removing said assembled fitting element from said assembling machine; and
   (I) wherein said fitting element comprises a plate and an operating rod that are connected together in a working relationship; and
   (J) wherein said assembling machine includes two superimposed transporters that move step by step, one of said superimposed transporters moving said operating rod while the other superimposed transporter moves said plate, the inner face of said plate being oriented to face upward, said operating rod being positioned below said plate at a predetermined point along the travel path of said assembly machine, a part being assembled onto said operating rod and said plate being connected to said operating rod; and
   (K) wherein an oscillating loading arm takes said plate from said lower of said two superimposed transporters and places it, after turning it around, on the first of said plurality of transporters, a transfer element ensuring that said operating rod is placed below said plate at the entry of this first transporter.

2. The assembly machine of claim 1, further comprising means for temporarily storing said parts to be assembled to said fitting element in recesses in lugs on said assembly machine until said fitting element arrives at said predetermined assembly points, at which point said part is attached to said fitting element.

3. The assembly machine of claim 2, wherein said lugs are situated in two rows, the first row having a reservation for the placing of a part to be assembled to said fitting element, the second row being provided with a reservation for each variable position of a part to be assembled to said fitting element.

4. The assembly machine of claim 1, comprising means of superimposing the flow of said plate and said operating rod by a second section of a first transporter comprising a chain transporter having at least two parallel chains that are driven by toothed pinions and are fitted with rows of lugs.

5. The assembly machine claim 1, wherein said transfer means orients the outer face of said plate to face upward, said transfer means comprising an oscillating loading arm that is situated proximate an entry point of one of said plurality of transfer means.

6. The assembly machine of claim 1, wherein said transfer means orients the inner face of said operating rod connected to said plate to face upward, said transfer means comprising an oscillating loading arm that is situated proximate an entry point of one of said plurality of transfer means.

7. The assembly machine of claim 1, further comprising a first series of rivetters that are situated proximate the outer face of said plate for rivetting a first assembly of parts to be assembled and a second series of rivetters situated proximate the inner face of said operating rod for rivetting a second assembly of parts to be assembled.

* * * * *